US00RE35325E

United States Patent [19]

Wass et al.

[11] E Patent Number: Re. 35,325

[45] Reissued Date of Patent: Sep. 3, 1996

[54] TERMINAL BLOCK

[75] Inventors: Charles W. Wass, Huntington Beach; Mark R. Jespersen, Burbank, both of Calif.

[73] Assignee: PSI Telecommunications, Inc., Burbank, Calif.

[21] Appl. No.: 310,250

[22] Filed: Sep. 21, 1994

Related U.S. Patent Documents

Reissue of:

[64] Patent No.: 5,149,278
Issued: Sep. 22, 1992
Appl. No.: 660,284
Filed: Feb. 22, 1991

[51] Int. Cl.[6] ..... H01R 4/24

[52] U.S. Cl. ..... 439/412

[58] Field of Search ..... 439/411–414

[56] References Cited

U.S. PATENT DOCUMENTS

| | | | |
|---|---|---|---|
| 4,040,701 | 8/1977 | Gressitt | 439/412 |
| 4,423,918 | 1/1984 | Filreis et al. | 439/412 |
| 4,652,071 | 3/1987 | Debortoli et al. | 439/412 |
| 4,734,061 | 3/1988 | Randall, Jr. et al. . | |
| 4,826,449 | 5/1989 | Debortoli et al. | 439/411 |
| 4,846,721 | 7/1989 | Debruycker et al. . | |
| 4,993,966 | 2/1991 | Levy | 439/411 |

*Primary Examiner*—Khiem Nguyen
*Attorney, Agent, or Firm*—Graham & James

[57] ABSTRACT

A telecommunications terminal block employs a housing having a number of separate dielectrically, isolated chambers disposed therein. Service wires to be connected to a splice cable are inserted into a chamber through openings in the housing and into a movable wire carrier member disposed within the chamber. An actuator member drives the carrier member from a first position, at which the wires are inserted, to a second position where the wires engage a contact element which electrically couples them to the splice cable. The carrier member moves within the chamber so as to allow, an electrically insulating medium within the chamber to flow around the carrier and maintain a constant volume of the medium within the chamber. Loss of insulating medium is thereby avoided during connection and reconnection of the service wires allowing improved protection from environmental factors such as moisture, chemicals and other contaminants.

38 Claims, 4 Drawing Sheets

FIG. 2a
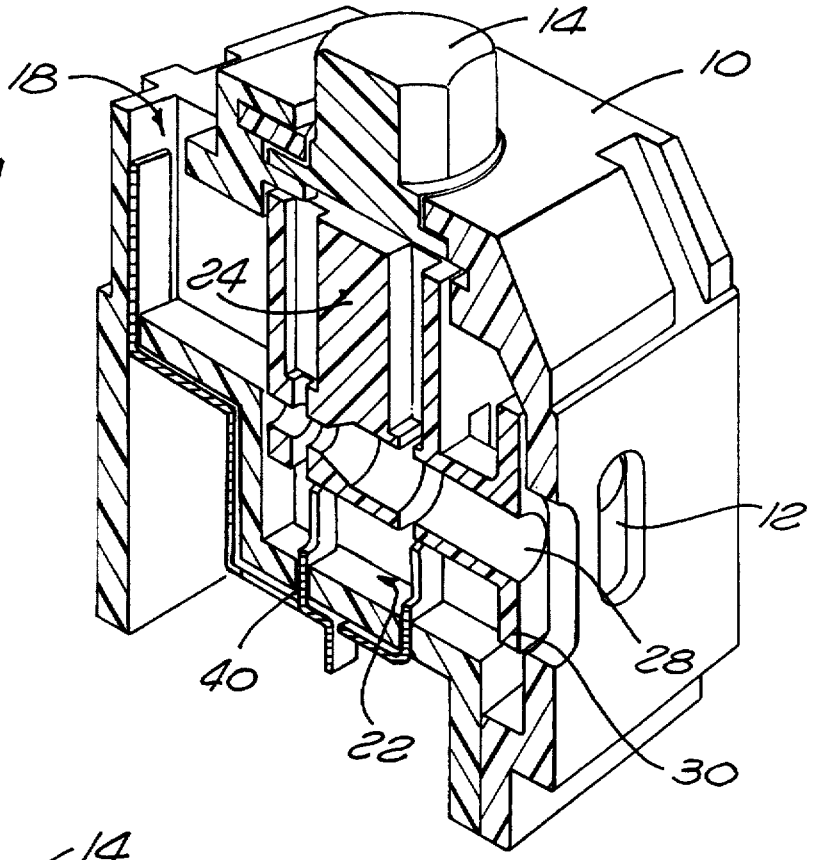
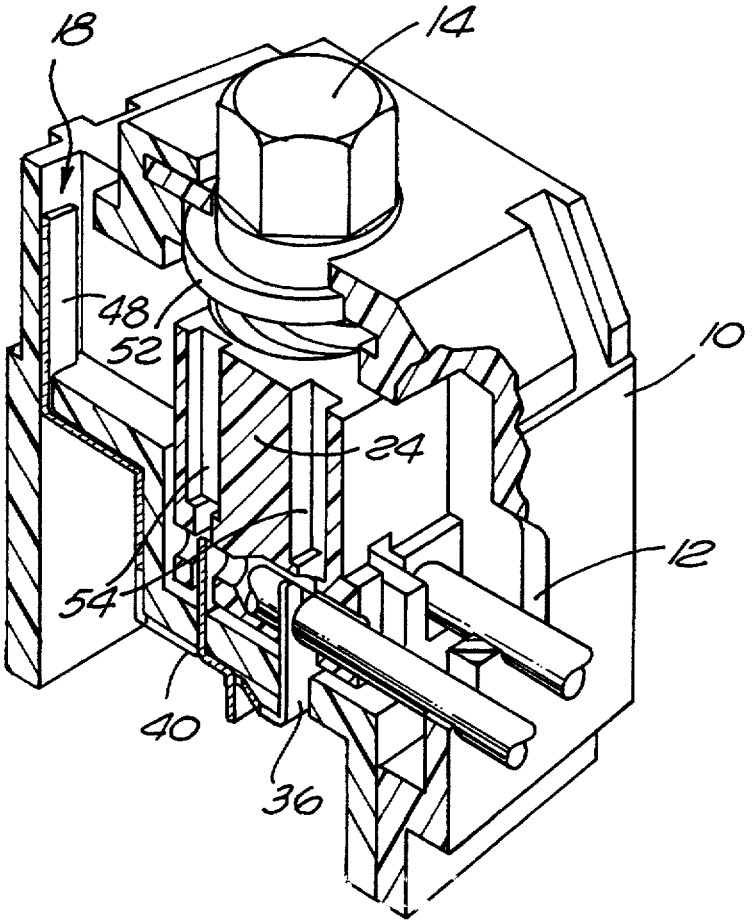
FIG. 2b

TERMINAL BLOCK

Matter enclosed in heavy brackets [ ] appears in the original patent but forms no part of this reissue specification; matter printed in italics indicates the additions made by reissue.

BACKGROUND OF THE INVENTION

1.Field of the Invention

The present invention relates to terminal blocks for connecting multiple wire pairs. More particularly, the present invention relates to telecommunications terminal blocks for connecting telephone service wires to telephone company distribution cables.

2. Background of the Prior Art and Related Information

Telecommunications terminal blocks are used to provide electrical connections between telephone customer service wires and the telephone company's distribution cables. Such terminal blocks typically connect from 2 to 50 individual service wire pairs to the distribution cable which may have several thousand wire pairs. The terminal block is spliced to the distribution cable through a splicing cable or stub cable which forms part of the terminal block. The customer service wire pairs in turn are connected to the terminal block through some type of terminal which is easy to connect and reconnect on site.

One of the most commonly used terminals is a simple binding post where a stripped service wire is connected to the binding post and then secured with some type or cap. Another common type of terminal is an insulation displacement terminal where the service wire need not be bared prior to the connection to the terminal block and the insulation is severed through a blade or other sharp surface as the service wire is secured to the terminal. Again, in the insulation displacement type of terminal, some type of cap is typically employed to secure the service wire in place.

While the caps typically employed in the binding post or insulation displacement type terminals provide some protection from the environment, nonetheless, moisture, pollutants, chemicals, dust and even insects may reach the terminal connection resulting in corrosion or other degradation of the contact. This problem is exacerbated by the fact that in addition to the traditional aerial location of such terminal blocks, underground and even underwater terminal block locations are more and more frequently required for telephone distribution applications. Accordingly, efforts have been made to better insulate the terminal in the terminal block from the environment to prevent such degradation. One such approach has been to use a variety of insulating mediums, such as greases or gels to surround the terminal where the electrical connection is made.

One example of the use of an insulating medium to protect a service wire terminal from the environment is illustrated in U.S. Pat. No. 4,734,061 ('061 patent). In the telecommunications terminal block of the '061 patent, the service wire terminals are provided in a number of isolated cells in a terminal block body composed of a dielectric material. A threaded contact plate in the bottom of each cell and a matching threaded plug are used to make the electrical connection with the service wire. An O-ring seal is provided on the plug to contact the wall of the cell as the plug is inserted into the cell to reduce moisture and other environmental hazards entering into the contact area. Additionally, an insulation medium such as a silicon gel is injected into the region below the plug during manufacture of the terminal block to provide further protection from the environment.

Although the terminal block of the '061 patent apparently provides improved environmental protection over a simple screw type binding post terminal, nonetheless, the entry of moisture or other environmental hazards through the service wire entry openings into the cells is only prevented by the presence of an insulating gel in the contact area of the cell and by precise matching of the service wire diameter to the wire entrance holes. Due to the requirement that the plug make secure contact with the service wire in the bottom of the cell, however, the volume in the cell available for an insulating gel is very limited. During repeated connections and reconnections of service wires inserted into the gel containing portion of the cell, this gel may be lost or displaced, leaving room for moisture or environmental contaminants to enter into the electrical contact area within the cell. Furthermore, such approach is not readily adaptable to an insulation piercing type of terminal since such a terminal requires the service wires to be displaced a sufficient distance in the cell to have the insulation cut by an insulation cutting blade. During such a relatively large displacement, gel would be forced out of the service wire openings and lost, permitting moisture or other contaminants to enter the cell when a reconnection is made.

Another approach to overcoming the problem of protecting contact terminals from the environment is illustrated in U.S. Pat. No. 4,846,721 ('721 patent). In the telecommunications terminal block of the '721 patent, a threaded binding post and matching threaded cap are employed to make electrical contact to a service wire inserted into an aperture in the terminal block body. Additionally, in the '721 patent, provision is made for employing increased amounts of insulating gel in the aperture by providing another aperture for overflow gel to flow into as the binding cap is screwed down onto the binding post. Although this approach allows use of an increased volume of gel, and apparently is directed to overcoming some of the problems discussed above in relation to the '061 patent, nonetheless, such approach is believed to introduce problems of its own. In particular, the gel overflow aperture would itself provide an access point for moisture or contaminants if left open to the outside of the terminal block body. Alternatively, if the aperture is closed then the volume of gel would be limited due to the compression resulting from driving the gel into the aperture during screwing down of the cap. Additionally, during repeated connections and reconnections of service wires, voids could be introduced into the region surrounding the connection due to gel flowing into and out of the aperture during repeated screwing and unscrewing of the binding cap.

Accordingly, a need presently exists for an improved telecommunications terminal block having increased resistance to moisture and other environmental factors which subject the connections therein to degradation over time and limit the applications where such terminal blocks may be reliably employed.

SUMMARY OF THE INVENTION

The present invention provides an improved telecommunications terminal block having increased resistance to environmental factors.

In a preferred embodiment, the telecommunications terminal block of the present invention employs a housing formed of a dielectric material, the interior of which is divided into a number of electrically isolated chambers. The number of chambers will be determined by the number of wire pairs desired to be connected through the terminal block and may typically be from 2 to 50 in number for conventional telecommunications applications. A pair of wire access slots is provided in the housing for each chamber so as to allow the wire pairs to be inserted into the interior of each isolated chamber. Within each chamber is disposed a movable wire carrier which has openings therein, aligned with the wire access slots in the housing, to receive the wire pairs inserted into the chamber. The carrier is driven by an actuator which extends out of the housing so as to be readily reached by the user of the terminal block during service wire connection and reconnections in the field. Also extending into the chamber is a set of insulation piercing electrical contact blades which are electrically connected to a splice cable running through the bottom of the housing outside of the isolated chambers. Room is provided in the chamber for an insulating medium, such as a grease or gel, to be injected so as to surround the wire carrier member and fill the wire engaging openings in the carrier.

To effect connection of a service wire pair, the wires are first inserted into the wire carrier. The wire carrier member is then moved to a second position where the wires are forced into contact with the insulation piercing contact elements by the actuator. Channels are provided in the sides of the wire carrier to allow the insulating medium to flow from one end to the other of the carrier as the carrier is moved from the position where the wires are received into the carrier to the second position where the wires are forced into electrical contact with the insulation cutting blades. Similarly, during disconnection of the wires, the channels allow the insulating medium to flow back to its original position. This allows a constant volume of the insulating medium to be maintained within the chamber even during multiple connections and reconnections of service wire pairs into the terminal block. Additionally, a flange is provided on one side of the carrier adjacent the wire slots in the housing to keep such slots sealed off as the carrier moves from the first to the second position to prevent outflow of the insulating medium through the wire slots.

Therefore, due to these features, loss of insulating medium is avoided, as are voids or pockets in the medium within the chamber, preventing sources of entry for moisture or contaminants into the chambers where the electrical connections are made. Furthermore, since the insulating medium can flow around the carrier during the connection of the service wires to the terminal, a relatively large volume of insulating medium may be used such that any relatively small loss of such medium during replacement of service wires will not affect the protection afforded.

In a preferred embodiment, the actuator member may take the form of a simple threaded plug rotatably mounted in the housing with the carrier having a matching threaded opening so as to be reciprocated up and down by rotation of the plug. Thus, a reliable, easy to manufacture structure is a further feature of the terminal block of the present invention. Additionally, a test contact and corresponding test lead openings in the housing may also be provided to allow testing of the cable pairs before or after termination of the service wires. Further features and advantages of the present invention will be appreciated by review of the following detailed description of the present invention.

Accordingly, it will be appreciated that the present invention provides an improved telecommunications terminal block having significantly improved resistance to environmental factors such as moisture, chemicals and other such contaminants while retaining a relatively simple construction.

BRIEF DESCRIPTION OF THE DRAWINGS

FIGS. 2a and 2b are broken away views showing the interior of one isolated chamber in the terminal block of the present invention, illustrating the wire carrier position before and after terminating a wire, respectively.

DETAILED DESCRIPTION OF THE INVENTION

Figure 1A:
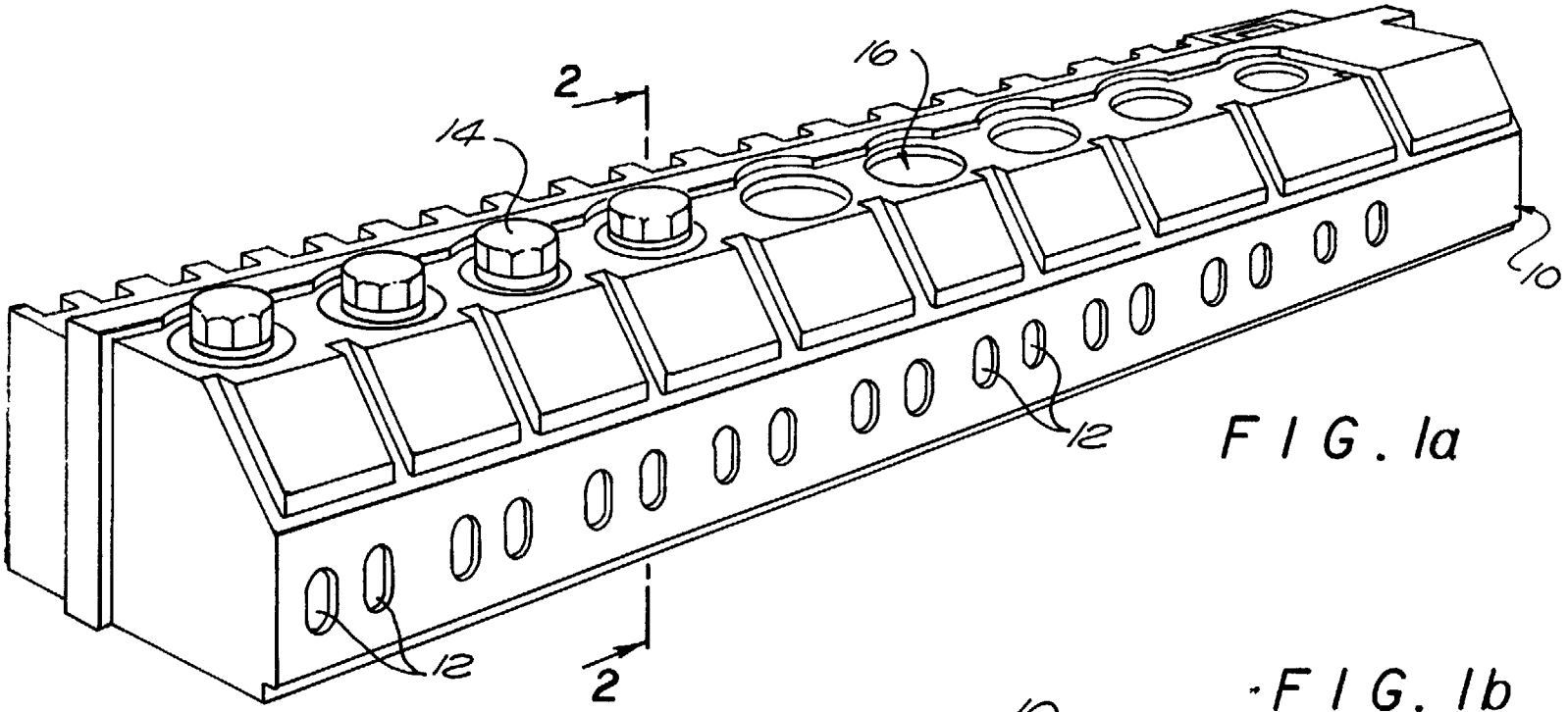
FIG. 1a is a perspective view and FIG. 1b is a top view of a preferred embodiment of the improved telecommunications block of the present invention.
Figure 1B:
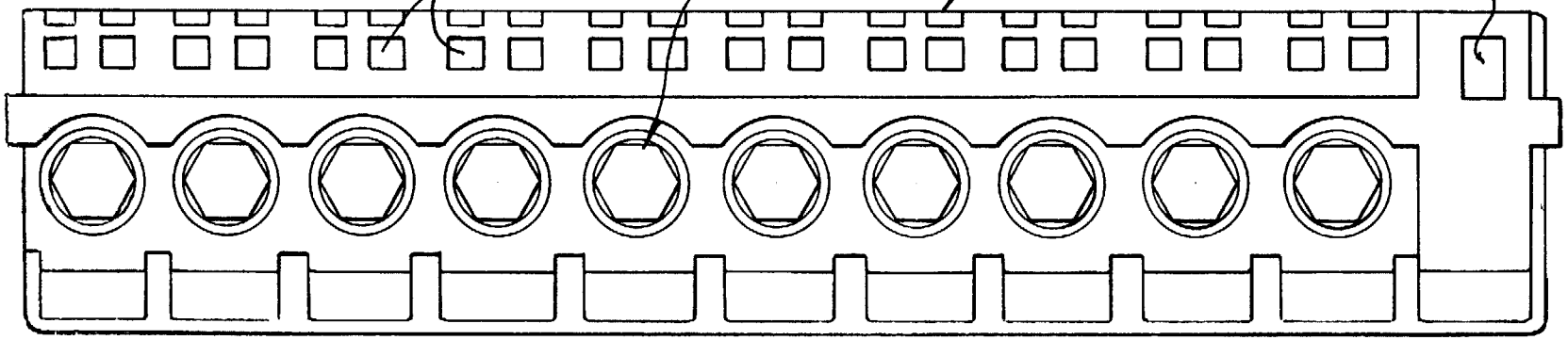

Referring to FIGS. 1a and 1b, a perspective and top view of a preferred embodiment of an improved telecommunications terminal block of the present invention is illustrated showing the outside thereof. As illustrated, the terminal block of the present invention employs an elongated housing 10 having a plurality of wire pair openings 12 along a front surface thereof. Housing 10 is composed of a dielectric material, suitable for manufacture in the desired shape. For example, any one of several commercially available thermoplastic resins may be readily employed due to their relatively low cost and ease of manufacture. Other dielectric materials may be also employed, however.

As shown in FIG. 1a, the wire pair openings 12 are spaced apart along the length direction of housing 10 and as will be discussed in more detail below provide access of service wires into isolated internal chambers within housing 10. The number of pairs of wire openings 12 thus corresponds to the number of internal chambers and will vary with the specific application of the terminal block. In conventional telecommunications applications for providing service wire drop connection to telephone distributions cables, 2 to 50 pairs of service wires are typically connected by a single terminal block. Other applications may require different numbers of wire pairs, however. Also, for other types of applications, a single wire opening instead of a pair of openings 12 may be employed for each chamber, or additional wire openings could be provided into each chamber if a need arose in a specific application. Accordingly, the configuration of openings and their spacing along the housing 10 is an illustrative preferred embodiment only and may be varied with the specific application as needed.

Still referring to FIGS. 1a and 1b, arrayed along the top of housing 10 are a series of terminal actuators 14 equal in number to the number of chambers contained within the housing 10 and respectively positioned over each such isolated chamber. Shown in FIG. 1a and 1b are the top portions of terminal actuators 14 and, as will be discussed in more detail below, the remainder of each actuator extends through the housing 10 into each respective chamber. As illustrated in FIG. 1a by the positions where terminal actuators 14 have been omitted for illustration, the actuators 14 are inserted into the interior of the housing 10 through matching openings 16 in housing 10. Terminal actuators 14 are preferably made of a dielectric material which may be the same as housing 10. The top of the terminal actuator 14 preferably has a shape which may be readily engaged and turned by a hand held wrench or other implement. Alternatively, actuator 14 may be adapted to be grasped and turned by a user of the terminal block. Turning the actuator a fixed amount, preferably indicated by visual markings on the housing and actuator, effects the connection of the service wires to the splice cable in a manner to be discussed in more detail below.

As further illustrated in FIG. 1b, housing 10 also has a pair of test ports 18 for each internal chamber position. These test ports 18 provide ready access to the terminals located within housing 10 to allow testing of the cable pairs without opening housing 10 or disconnecting service wires. As further shown in FIG. 1b, housing 10 includes an opening 20 at one end thereof containing a wire pair splitter therein. This provides a convenient means for splitting service wire pairs in the field during connection to the terminal block.

Figure 3:
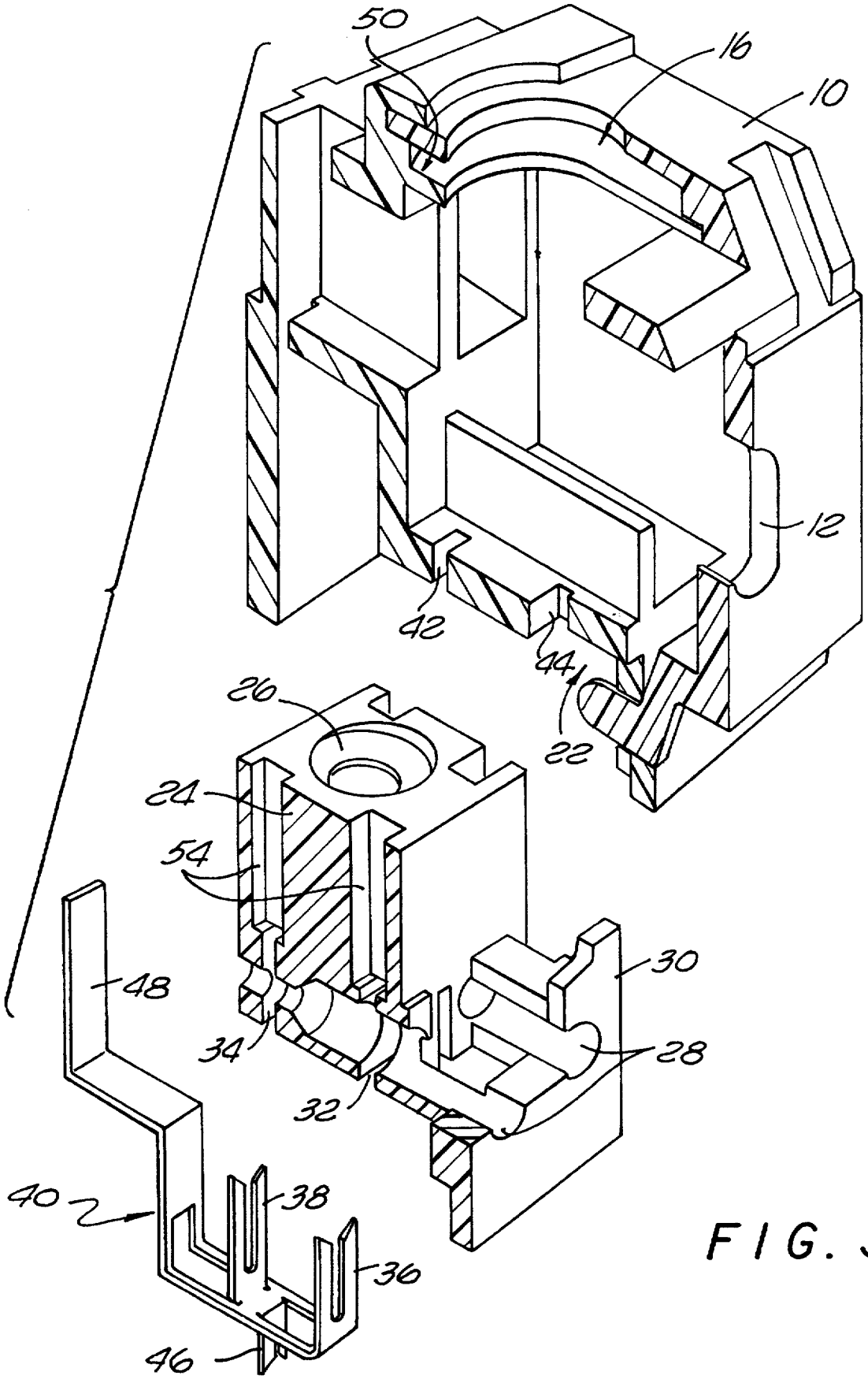
FIG. 3 is an exploded view of the basic components or one chamber in the terminal block of the present invention.

Referring to FIGS. 2a and 2b, a partially broken away cross-sectional view taken along lines 2—2 in FIGS. 1a and 1b is shown illustrating the interior of a single chamber of the terminal block of the present invention. In FIG. 3, such a single chamber is illustrated in a perspective exploded view.

As illustrated, each internal chamber 22 is preferably integrally formed with the tops and sides of housing 10. The openings 16 which receive terminal actuator 14 and wire access slots 12 thus provide direct access into the chamber 22 from outside housing 10. Positioned within each chamber 22 and threadedly engaged with the terminal actuator 14 is a wire carrier member 24. More particularly, as shown in FIG. 3, the carrier member 24 has a threaded opening 26 in the top end thereof for receiving the matching size threaded end of terminal actuator 14. Wire carrier member 24 also has a pair of wire receiving openings 28 for receiving service wire pairs inserted into the chamber through wire access slots 12. The wire access openings 28 extend through a flanged extension 30 of the wire carrier 24 into the central portion of the carrier 24. A first contact blade receiving slot 32 is provided in the carrier at a first position along opening 28 and a second contact blade receiving slot 34 is provided at a second inner position of the opening 28.

The first and second contact blade receiving slots 32, 34, respectively, receive first and second insulation cutting contact blades 36, 38, when the wire carrier member 24 is in the closed position illustrated in FIG. 2b. The insulation cutting blades 36, 38 extend up from a double L-shaped contact element 40 which is configured outside chamber 22 and contact blades 36, 38 extend into chamber 22 through slots 42, 44 in the bottom of chamber 22. A third contact blade 46 in turn extends outside of chamber 22 and provides connection to the splice cable (not shown). The contact element 40, including insulation cutting blades 36, 38 and 46, is preferably made of a metallic conductor to provide good electrical contact to the service wires when blades 36, 38 pierce the insulation thereof. Which of the two blades 36, 38 makes electrical contact to the wires is determined by the diameter of the wire. That is, whether the wire is inserted to the first slot 32 or second slot 34 will depend on the wire diameter. For example, as illustrated in FIG. 2b, a large gauge wire will only proceed along opening 28 far enough to reach slot 32 and will thus make electrical contact with blade 36. A smaller gauge wire in turn will reach to second slot 34 and make contact with the second, longer blade 38.

As shown in FIGS. 2a and 2b, the upper portion 48 of the double L-shaped contact element 40 also extends into an opening in the compartment 22 adjacent test lead port 18. This allows ready electrical connection to the service wires by test leads inserted into test ports 18. Although test port 18 and portion 48 of contact element 40 are shown opening into the chamber 22 they may be equally provided in a separate test access opening sealed off from the chamber 22.

As best illustrated in FIG. 3, the top portion of housing 10 over the chamber 22 is provided with an annular slot 50 around opening 16. The top end of terminal actuator 14 is provided with a matching annular flange 52 which fits within the annular groove 50 as illustrated in FIGS. 2a and 2b. This thus prevents vertical motion of the terminal actuator 14 during rotation thereof, in contrast to prior art actuator type connectors which screw down into a receptacle to make contact with a service wire.

In view of the foregoing structural description of the terminal block of the present invention, its functional features may be readily appreciated in consideration with FIGS. 2a and 2b.

Prior to use of the terminal block of the present invention for service wire connection, and preferably during manufacture or assembly of the terminal block, a suitable insulating medium is injected into the chamber 22 so as to completely surround the carrier 24 and fill wire openings 28 in carrier 24. Any one of a large number of well known commercially available greases, gels and other insulating mediums may be employed, depending on the specific requirements of the application. The viscosity and adhesive qualities of the medium should be such that wires may be inserted to and removed from openings 28 without adhering excessively to the medium and the medium should be sufficiently fluid so as to allow the carrier 24 to move therethrough. The medium may be injected into the chamber 22 through wire openings 28, test port 18 or during some intermediate assembly point in the manufacture of the terminal block. Also, the medium may be injected in a precured state or injected in an uncured state and subsequently allowed to cure.

In the field, the service wires desired to be connected to the splice cable (not shown) are inserted into openings 28 with the carrier 24 configured in a first position illustrated in FIG. 2a. In this position, the wires may be readily inserted into the interior of carrier 24 displacing only a very moderate amount of insulating medium. As may be appreciated from FIG. 2a, in the first position, the flanged extension 30 of carrier 24 blocks the portion of wire access slots 12 below the openings 28 preventing outflow of the insulating medium therethrough. Once the wires have been inserted into the openings 28 the user of the terminal block rotates terminal actuator 14 which in turn drives wire carrier member 24 downward due to the threaded engagement of actuator 14 and the carter member. Actuator 14 is rotated until the carrier 24 is driven down to the second position illustrated in FIG. 2b. In this position, the wires have been forced into contact with insulation cutting blade 36 (since a shown in FIG. 2b the wires are of a large diameter and cannot enter the narrower portion of openings 28). Insulation cutting blade 36 slices through the insulation on the wire providing good electrical contact to the inner conductive core of the wire.

During the downward motion of the carrier member 24, from the first position shown in FIG. 2a to the second position shown in FIG. 2b, the insulating medium inside chamber 22 will flow around the sides of carrier member 24 so as to be displaced from the bottom to the top portion of the chamber 22. In this regard, vertical channels 54 (seen most clearly in FIG. 3) may be provided on a carrier member 24 to facilitate the flow of the insulting medium around the carrier member as it is driven from the first to second position by rotation of actuator 14. Thus, despite the forcing down of the carrier member 24 and the wires connected thereto, the volume of insulating medium in the chamber 22 remains substantially constant, avoiding the outflow of medium and/or the creation of any voids which could allow the entry of moisture or contaminants from the environment.

Accordingly, it will be appreciated that the terminal block of the present invention provides significantly improved environmental protection and allows the multiple connection and reconnection of service wires to the terminal block without significant loss of insulating medium and concomitant loss of environmental protection capability. Furthermore, the present invention provides a terminal block which is simple to use and which is simple mechanically and not prone to failure even after repeated connections and reconnections.

Figure 4:
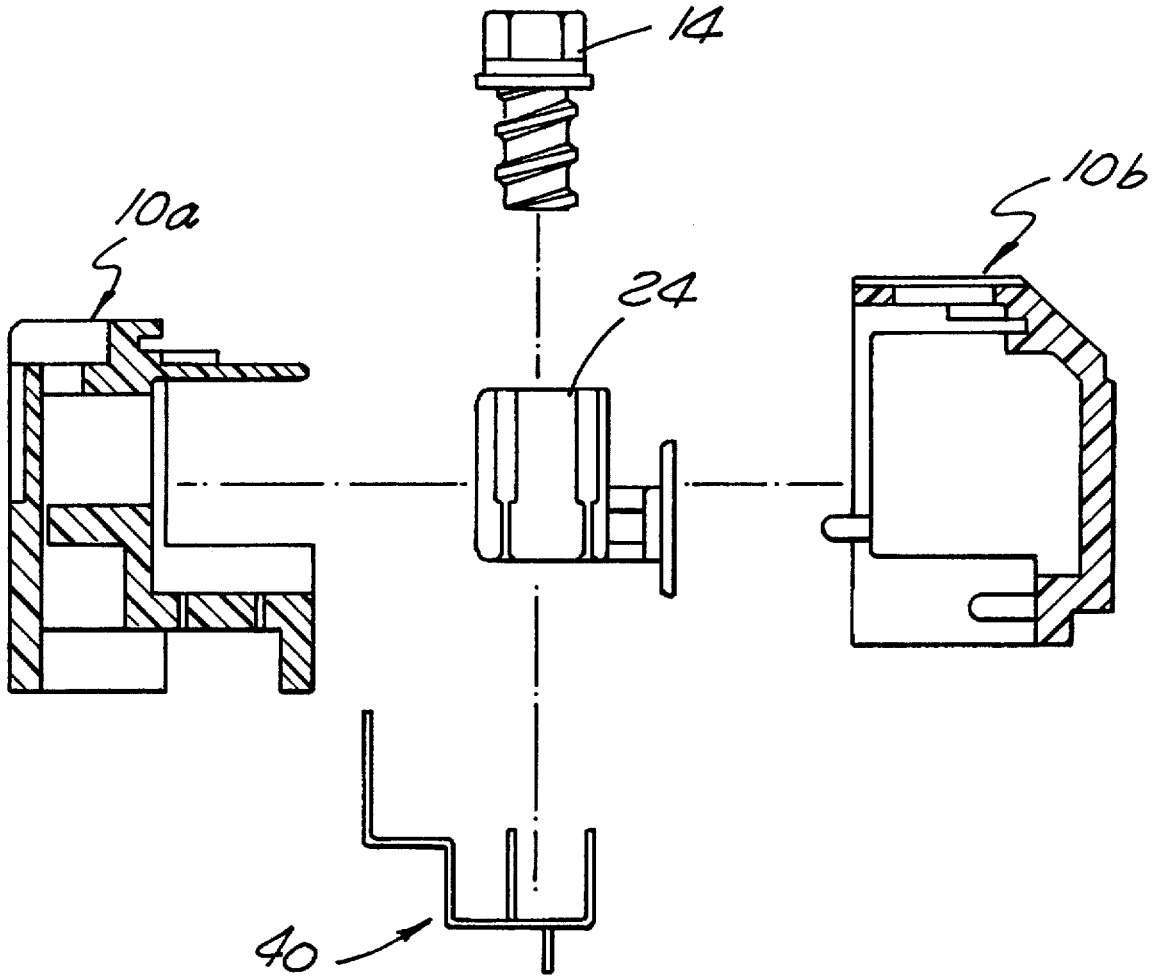
FIG. 4 is an exploded side view of one chamber of the terminal block of the present invention with the chamber housing separated into two pieces for ease of manufacture and assembly.

Referring to FIG. 4, an exploded side view of an alternate embodiment of the present invention is illustrated, adapted for increased ease of manufacture. As shown in FIG. 4, the terminal block includes a terminal actuator 14, carrier member 24 and contact element 40 as in the embodiment described above. As shown in FIG. 4, however, the housing 10 is formed in two separate sections 10a and 10b which may be separately manufactured, for example, by injection molding. During assembly, these portions 10a and 10b are then brought together to form an assembled housing 10 as illustrated in FIGS. 1–3. Thus, it will be appreciated that the present invention, in addition to providing the features described above, may also be manufactured in a cost effective manner, readily compatible with existing manufacturing technologies.

While the foregoing description has been of a presently preferred embodiment of the present invention, it should be appreciated that the terminal block of the present invention may be modified in a wide variety of ways while still remaining within the spirit and scope of the present invention. For example, the specific configurations of the housing, chamber, carrier member and carrier member actuator may all be varied due to specific manufacturing considerations or other reasons without departing from the spirit and scope of the present invention. Furthermore, while the present invention has been described as a terminal block adapted for use with an insulated wire, the present invention may equally well be employed with a bare wire. Additional variations and modifications of the preferred embodiment described above may also be made as will be appreciated by those skilled in the art and accordingly the above description of the present invention is only illustrative in nature.

What is claimed is:

1. A multi-wire terminal block comprising:

an elongated housing having a plurality of separate chambers and a plurality of holes for allowing wire pairs to be inserted into said chambers;

a plurality of electrical contact elements, respectively configured in each of said plurality of separate chambers;

a plurality of wire carrier members, each configured in a respective one of the plurality of separate chambers, each of said wire carrier members having one or more openings for receiving wire pairs inserted through the holes in said chambers, and each said wire carrier member being movable within the chamber so as to move a wire engaged thereby into contact with said electrical contact element; and a plurality of actuator mechanisms, each coupled to a respective one of said plurality of wire carrier members and adapted to move said wire carrier member within said chamber and relative to said actuator mechanism in a manner such that the actuator mechanism does not change its degree of entry into the chamber.

2. A multi-wire terminal block as set out in claim 1, wherein said housing further has a plurality of test lead openings and wherein a portion of each of the electrical contact elements extends into the respective test lead opening.

3. A multi-wire terminal block as set out in claim 1, wherein each of said electrical contact elements is a metal element configured outside the chamber and having a pair of slotted insulation cutting blades extending into said chamber toward said wire carrier member and another pair of slotted insulation cutting blades extending in the opposite direction outside of the chamber.

4. A multi-wire terminal block as set out in claim 3, wherein each of said wire carrier members further has a slot extending across said wire pair receiving openings and adapted to receive one end of said slotted insulation cutting blades.

5. A multi-wire terminal block, as set out in claim 1, wherein each of said actuator mechanisms is a screw having one end thereof extending outside said housing and the other end thereof engaging said respective wire carrier member and wherein said wire carrier member has a threaded opening adapted to receive said other end of the screw such that rotation of said screw moves the wire carrier member within the chamber.

6. A multi-wire terminal block as set out in claim 5, wherein each of said screws includes an annular flange adjacent said one end thereof and wherein said housing includes a plurality of annular grooves adapted to receive said annular flange of respective screws extending through said housing and restrain each said screw from moving relative to said housing when said screw is rotated to actuate said wire carrier member.

7. A multi-wire terminal block as set out in claim 5, wherein each of said wire carrier members is a generally box-shaped structure, wherein said threaded opening extends into the box shape in a first end thereof and wherein said wire receiving openings extends into said box shape in a side adjacent to a second end of the box shape.

8. A multi-wire terminal block as set out in claim 7, wherein said wire carrier member has a plurality of channels in one or more of the sides of the box-shaped structure, said channels extending from the first to second end of the carrier member.

9. A multi-wire terminal block as set out in claim 7, wherein said wire carrier member has a flanged extension extending from the side containing the wire receiving openings and wherein said openings extend through said flanged extension.

10. A multi-wire terminal block, comprising:

a housing having a plurality of separate chambers spaced along a length direction thereof, said housing including one or more wire access ports leading into each of said chambers, each of said chambers being adapted to hold a predetermined volume of a fluid insulating medium;

a plurality of electrical contact elements respectively configured within each chamber;

wire carrier means, configured within each of said chambers, for engaging wires inserted into each of said chambers and moving said wires into electrical contact with said electrical contact element; and means for actuating movement of said wire carrier means within each of said chambers in a manner such that a substantially constant volume of said fluid insulating medium, relative to the total volume of said chamber, is maintained within said chamber during such movement.

11. A multi-wire terminal block as set out in claim 10, wherein said wire carrier means comprises a movable member having a threaded hole therein and one or more holes for receiving wires therein and wherein said means for actuating comprises a threaded bolt rotatably mounted to said housing and adapted to fit within the threaded hole of said wire carrier means.

12. A multi-wire terminal block as set out in claim 10, wherein said wire carrier means has a plurality of wire receiving openings for receiving wires inserted into each of said chambers, said wire receiving openings being aligned with said wire access ports in said housing when said wire carrier means is in a first position and wherein said wire receiving openings are adjacent said electrical contact element when said wire carrier means is in a second position.

13. A multi-wire terminal block as set out in claim 12, wherein said wire carrier means has one or more channels in the sides thereof to allow the insulating medium to flow past the wire carrier means when the wire carrier means moves from said first position to said second position.

14. A multi-wire terminal block, of a type adapted for use with an electrically insulating medium, comprising:

an elongated housing having a plurality of separate chambers, said chambers being adapted to receive said electrically insulating medium, said housing having a plurality of holes for allowing wire pairs to be inserted into said chambers;

a plurality of electrical contact elements, respectively configured in each of said plurality of separate chambers;

a plurality of wire carrier members, each configured in a respective one of the plurality of separate chambers, each of said wire carrier members having one or more openings for receiving wire pairs inserted through the holes in said chambers, and each said wire carrier member being movable within the chamber;

a plurality of actuator mechanisms, each coupled to a respective one of said plurality of wire carrier members and adapted to move said wire carrier member within said chamber so as to move a wire engaged thereby into contact with said electrical contact element; and means for allowing said electrically insulating medium to flow around the wire carrier member as it is moved within the chamber by said actuator mechanism.

15. A multi-wire terminal block as set out in claim 14, wherein said means for allowing said electrically insulating medium to flow around the wire carrier member comprises one or more channels configured so as to allow said electrically insulating medium to flow through said channels around said wire carrier member as it moves through said chamber.

16. A multi-wire terminal block comprising:

an elongated housing having a plurality of separate chambers and a plurality of holes for allowing wire pairs to be inserted into said chambers, said housing further having a plurality of test lead apertures;

a plurality of electrical contact elements, respectively configured in each of said plurality of separate chambers, said electrical contact elements having a portion thereof adapted to receive a test lead and said test lead apertures providing access from the outside of said housing to said portion of the contact element;

a plurality of wire carrier members, each configured in a respective one of the plurality of separate chambers, each of said wire carrier members having one or more openings for receiving wires inserted through the holes in said chambers, and each said wire carrier member being movable within said chamber so as to move a wire engaged thereby into contact with said electrical contact element; and means for moving each said wire carrier member so as to electrically connect the wires inserted therein to said electrical contact element in a manner such that the position or the test lead aperture and said test lead portion of the electrical contact element remain unchanged.

17. A multi-wire terminal block as set out in claim 16, wherein said portion of the electrical contact element adapted to receive a test lead extends out of said chamber to a position adjacent said test aperture.

18. A multi-wire terminal block as set out in claim 16, wherein each of said electrical contact elements is an S-shaped metal member having slotted wire engaging elements at one portion of said S-shape and the other portion of said S-shape comprising said portion adapted to receive a test lead.

19. A multi-wire terminal block as set out in claim 18, wherein said portion of the electrical contact element further comprises an extended metal leg extending from the upper portion of the S-shape toward the test lead aperture.

*20. A terminal block comprising:*

*a housing having a chamber and a hole for allowing a wire to be inserted into said chamber;*

*an electrical contact element configured in said chamber;*

*a wire carrier member configured in said chamber, said wire carrier member having an opening for receiving a wire inserted through the hole in said chamber, and said wire carrier member being movable within the chamber so as to move a wire engaged thereby into contact with said electrical contact element; and*

*an actuator mechanism, coupled to said wire carrier member and adapted to move said wire carrier member within said chamber and relative to said actuator mechanism in a manner such that the actuator mechanism does not change its degree of entry into the chamber.*

*21. A terminal block as set out in claim 20, wherein said housing further has a test lead opening and wherein a portion of the electrical contact element extends into the test lead opening.*

*22. A terminal block as set out in claim 20, wherein said electrical contact element is a metal element configured outside the chamber and having a slotted insulation cutting blade extending into said chamber toward said wire carrier member and another slotted insulation cutting blade extending in the opposite direction outside of the chamber.*

*23. A terminal block as set out in claim 22, wherein said wire carrier member further has a slot extending across said wire receiving opening and adapted to receive one end of said slotted insulation cutting blade.*

*24. A terminal block, as set out in claim 20, wherein said actuator mechanism is a screw having one end thereof extending outside said housing and the other end thereof engaging said wire carrier member and wherein said wire carrier member has a threaded opening adapted to receive said other end of the screw such that rotation of said screw moves the wire carrier member within the chamber.*

*25. A terminal block as set out in claim 24, wherein said screw includes an annular flange adjacent said one end*

*thereof and wherein said housing includes an annular groove adapted to receive said annular flange of said screw extending through said housing and restrain said screw from moving relative to said housing when said screw is rotated to actuate said wire carrier member.*

*26. A terminal block as set out in claim 24, wherein said wire carrier member is a generally box-shaped structure, wherein said threaded opening extends into the box shape in a first end thereof and wherein said wire receiving opening extends into said box shape in a side adjacent to a second end of the box shape.*

*27. A terminal block as set out in claim 26, wherein said wire carrier member has a channel in one or more of the sides of the box-shaped structure, said channel extending from the first to second end of the carrier member.*

*28. A terminal block as set out in claim 26, wherein said wire carrier member has a flanged extension extending from the side containing the wire receiving opening and wherein said opening extends through said flanged extension.*

*29. A terminal block, comprising:*

*a housing having a chamber, said housing including one or more wire access ports leading into said chamber, said chamber being adapted to hold a predetermined volume of a fluid insulating medium;*

*an electrical contact element respectively configured within said chamber;*

*wire carrier means, configured within said chamber, for engaging a wire inserted into said chamber and moving said wire into electrical contact with said electrical contact element; and*

*means for actuating movement of said wire carrier means within said chamber in a manner such that a substantially constant volume of said fluid insulating medium, relative to the total volume of said chamber, is maintained within said chamber during such movement.*

*30. A terminal block as set out in claim 29, wherein said wire carrier means comprises a movable member having a threaded hole therein and one or more holes for receiving a wire therein and wherein said means for actuating comprises a threaded bolt rotatably mounted to said housing and adapted to fit within the threaded hole of said wire carrier means.*

*31. A terminal block as set out in claim 29, wherein said wire carrier means has a wire receiving opening for receiving a wire inserted into said chamber, said wire receiving opening being aligned with said wire access port in said housing when said wire carrier means is in a first position and wherein said wire receiving opening is adjacent said electrical contact element when said wire carrier means is in a second position.*

*32. A multi-wire terminal block as set out in claim 31, wherein said wire carrier means has one or more channels in the sides thereof to allow the insulating medium to flow past the wire carrier means when the wire carrier means moves from said first position to said second position.*

*33. A terminal block, of a type adapted for use with an electrically insulating medium, comprising:*

*a housing having a chamber, said chamber being adapted to receive said electrically insulating medium, said housing having a hole for allowing a wire to be inserted into said chamber;*

*an electrical contact element, configured in said chamber;*

*a wire carrier member, configured in said chamber, said wire carrier member having an opening for receiving a wire inserted through the hole in said chamber, and said wire carrier member being movable within the chamber;*

*an actuator mechanism, coupled to said wire carrier member and adapted to move said wire carrier member within said chamber so as to move a wire engaged thereby into contact with said electrical contact element; and*

*means for allowing said electrically insulating medium to flow around the wire carrier member as it is moved within the chamber by said actuator mechanism.*

*34. A terminal block as set out in claim 33, wherein said means for allowing said electrically insulating medium to flow around the wire carrier member comprises one or more channels configured so as to allow said electrically insulating medium to flow through said channel around said wire carrier member as it moves through said chamber.*

*35. A terminal block comprising:*

*a housing having a chamber and a hole for allowing a wire to be inserted into said chamber, said housing further having a test lead aperture;*

*an electrical contact element, configured in said chamber, said electrical contact element having a portion thereof adapted to receive a test lead and said test lead aperture providing access from the outside of said housing to said portion of the contact element;*

*a wire carrier member, configured in said chamber, said wire carrier member having an opening for receiving a wire inserted through the hole in said chamber, and said wire carrier member being movable within said chamber so as to move a wire engaged thereby into contact with said electrical contact element; and* means for moving said wire carrier member so as to electrically connect the wire inserted therein to said electrical contact element in a manner such that the position of the test lead aperture and said test lead portion of the electrical contact element remain unchanged.

*36. A terminal block as set out in claim 35, wherein said portion of the electrical contact element adapted to receive a test lead extends out of said chamber to a position adjacent said test aperture.*

*37. A terminal block as set out in claim 35, wherein said electrical contact element is an S-shaped metal member having a slotted wire engaging element at one portion of said S-shape and the other portion of said S-shape comprising said portion adapted to receive a test lead.*

*38. A terminal block as set out in claim 37, wherein said portion of the electrical contact element further comprises an extended metal leg extending from the upper portion of the S-shape toward the test lead aperture.*

* * * * *